United States Patent
Katagiri et al.

(10) Patent No.: US 11,167,815 B2
(45) Date of Patent: Nov. 9, 2021

(54) SADDLED VEHICLE

(71) Applicant: HONDA MOTOR CO., LTD., Tokyo (JP)

(72) Inventors: Kiyoshi Katagiri, Wako (JP); Masahiro Miki, Wako (JP); Taishi Inoue, Wako (JP); Takeshi Konno, Wako (JP); Atsushi Hatayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 16/328,301

(22) PCT Filed: Aug. 30, 2017

(86) PCT No.: PCT/JP2017/031173
§ 371 (c)(1),
(2) Date: Feb. 26, 2019

(87) PCT Pub. No.: WO2018/043569
PCT Pub. Date: Mar. 8, 2018

(65) Prior Publication Data
US 2019/0210684 A1    Jul. 11, 2019

(30) Foreign Application Priority Data

Aug. 31, 2016    (JP) .............................. JP2016-169945

(51) Int. Cl.
*B60R 11/04*    (2006.01)
*B62J 45/40*    (2020.01)
(Continued)

(52) U.S. Cl.
CPC ............... *B62J 99/00* (2013.01); *B60R 11/04* (2013.01); *B62J 15/00* (2013.01); *B62K 25/02* (2013.01); *B62J 45/40* (2020.02)

(58) Field of Classification Search
CPC .......... B62J 99/00; B62J 15/00; B62K 25/02; B60R 11/04
(Continued)

(56) References Cited

U.S. PATENT DOCUMENTS 2,124,222 A * 7/1938 Wiley ........................ B62J 6/00
362/475
4,108,535 A * 8/1978 Slaughter ................... B62J 6/00
280/288.4
(Continued)

FOREIGN PATENT DOCUMENTS

CN           1350953           5/2002
CN           103373421         10/2013
(Continued)

OTHER PUBLICATIONS

International Search Report and Written Opinion for International Application No. PCT/JP2017/031173 dated Oct. 10, 2017, 8 pgs.
(Continued)

*Primary Examiner* — Tony H Winner
(74) *Attorney, Agent, or Firm* — Amin, Turocy & Watson, LLP

(57) ABSTRACT

A saddle riding vehicle includes a pair of left and right front forks (2L, 2R) configured to support a front wheel (Wf), a front fender (3) supported by the pair of left and right front forks (2L, 2R) and configured to cover the front wheel (Wf) from above, and an object information acquisition device (13) configured to image an outer side of the vehicle. An upper wall of the front fender (3) has an opening section (12) facing outside of the vehicle, and the object information acquisition device (13) is disposed in the opening section (12) such that an information acquisition part (13*a*) faces outside of the vehicle.

6 Claims, 10 Drawing Sheets

(51) Int. Cl.
*B62J 99/00* (2020.01)
*B62J 15/00* (2006.01)
*B62K 25/02* (2006.01)

(58) Field of Classification Search
USPC .................................................... 280/288.4
See application file for complete search history.

(56) References Cited

U.S. PATENT DOCUMENTS

| | | | | |
|---|---|---|---|---|
| 4,620,713 | A * | 11/1986 | Sakaguchi | B62J 15/00 |
| | | | | 280/152.3 |
| 4,852,971 | A * | 8/1989 | Kitrell | B62J 6/20 |
| | | | | 359/550 |
| 5,575,443 | A * | 11/1996 | Honeycutt | B62K 3/005 |
| | | | | 248/231.9 |
| 6,634,664 | B1 | 10/2003 | Kojima | |
| 8,016,307 | B2 * | 9/2011 | Adachi | B62J 15/02 |
| | | | | 280/152.1 |
| 9,440,697 | B1 * | 9/2016 | Yokoyama | B62J 15/00 |
| 2016/0264199 | A1 * | 9/2016 | Wakita | B62J 15/02 |

FOREIGN PATENT DOCUMENTS

| | | |
|---|---|---|
| CN | 105667658 | 6/2016 |
| DE | 102014218075 | 3/2015 |
| EP | 1201533 | 5/2002 |
| EP | 2026287 | 2/2009 |
| JP | 2006-103600 | 4/2006 |
| JP | 2008-221969 | 9/2008 |
| JP | 2008-257616 | 10/2008 |
| JP | 2008-310766 | 12/2008 |
| JP | 2009-035127 | 2/2009 |
| JP | 2009-204592 | 9/2009 |
| JP | 2013-220666 | 10/2013 |
| JP | 2015-033902 | 2/2015 |
| JP | 2015-058915 | 3/2015 |
| WO | 2011/077638 | 6/2011 |

OTHER PUBLICATIONS

Chinese Office Action for Chinese Patent Application No. 201780052560.3 dated Mar. 20, 2020.
European Office Action for European Patent Application No. 17846573.8 dated Sep. 15, 2020.
Indian Office Action for Indian Patent Application No. 201947008114 dated Jul. 28, 2020.
Japanese Notice of Allowance for Japanese Patent Application No. 2018-537350 dated Jun. 4, 2019.

* cited by examiner

SADDLED VEHICLE

TECHNICAL FIELD

The present invention relates to a saddle riding vehicle provided with an object information acquisition device such as an imaging device or the like configured to acquire information of an object outside a vehicle.

Priority is claimed on Japanese Patent Application No. 2016-169945, filed Aug. 31, 2016, the content of which is incorporated herein by reference.

BACKGROUND ART

A saddle riding vehicle provided with an object information acquisition device such as an imaging device or the like for the purpose of visual recognition assistance for a driver, recording of a traveling situation, or the like, has been developed (for example, see Patent Literature 1).

A saddle riding vehicle disclosed in Patent Literature 1 includes an imaging device using a CCD sensor, a MOS sensor, a CMOS sensor, or the like, on a back surface side of a transparent windscreen extending from an upper side of a front section of a handle section. An imaging section (a lens section) of the imaging device generally is installed on a back surface side of a windscreen to be directed toward a side in front of the vehicle, and images a side in front of a vehicle during traveling of the vehicle.

CITATION LIST

Patent Literature

[Patent Literature 1]
Japanese Unexamined Patent Application, First Publication No. 2006-103600

SUMMARY OF INVENTION

Technical Problem

The saddle riding vehicle disclosed in Patent Literature 1 appropriately captures an image of a side in front of the vehicle through the transparent windscreen at a substantially central position in a vehicle width direction.

However, in the saddle riding vehicle disclosed in Patent Literature 1, since the object information acquisition device (the imaging device) should be installed in a region surrounded by an instrument panel, a headlight, or the like, on a back surface side of the windscreen, a front visual field in which object information can be acquired is restricted. For this reason, in the case of the saddle riding vehicle disclosed in Patent Literature 1, it is difficult to respond to the demand for acquiring information of an object in front of the vehicle in a wide angle range using the object information acquisition device.

An aspect of the present invention is directed to providing a saddle riding vehicle capable of easily acquiring information of an object in front of a vehicle in a wide angle range.

Solution to Problem

A saddle riding vehicle according to the present invention employs the following configuration.

(1) A saddle riding vehicle according to an aspect of the present invention includes a pair of left and right front forks configured to support a front wheel; a front fender supported by the pair of left and right front forks and configured to cover the front wheel from above; and an object information acquisition device configured to acquire information of an object outside a vehicle via an information acquisition part, wherein an upper wall of the front fender has an opening section facing outside of the vehicle, and the object information acquisition device is disposed in the opening section such that the information acquisition part faces outside of the vehicle.

According to the configuration of (1), the object information acquisition device can acquire information of an object in a wide angle range in front of the vehicle in an upper wall portion of the front fender disposed below an instrument such as an instrument panel, a headlight, or the like.

(2) In the aspect of (1), a fender stay configured to support a space between a left end portion and a right end portion of the upper wall from below may be disposed below an upper wall of the front fender, and the object information acquisition device may be attached to the fender stay.

In the case of (2), since the object information acquisition device is attached to the fender stay configured to support a space between the left end portion and the right end portion of the upper wall of the front fender from below, a dedicated stay for installing the object information acquisition device on the front fender portion can be eliminated. Accordingly, the number of parts can be reduced and reduction in manufacturing costs and reduction is weight of the vehicle can be achieved by employing this configuration. In addition, since the object information acquisition device is attached to the fender stay disposed below the upper wall of the front fender, the object information acquisition device cannot be easily seen from the outside. For this reason, since this configuration is employed, a good external appearance is obtained.

(3) In the aspect of (1) or (2), the object information acquisition device may be attached to a stay for installing an object information acquisition device via an elastic member.

In the case of (3), vibration such as traveling vibration, engine vibration, or the like, input to the stay can be absorbed by the elastic member, and thus, cannot be easily transmitted to the object information acquisition device. Accordingly, since this configuration is employed, image blur of an image of the object information acquisition device due to input vibrations can be minimized.

(4) In the aspect of any one of (1) to (3), the front fender may have a first fender disposed on a front side, and a second fender disposed on a rear side, the first fender and the second fender may be coupled to each other to configure the front fender, and the opening section that opens toward a side in front of the vehicle may be formed in a joining section between the first fender and the second fender.

In the case of (4), since the opening section is formed in the joining section of the first fender and the second fender, which are separate members, the opening section for disposing the object information acquisition device can be easily formed.

In the aspect of any one of (1) to (4), the saddle riding vehicle may further include a wheel speed sensor configured to detect a rotational speed of the front wheel, wherein an electric cable of the object information acquisition device is routed along the front forks together with an electric cable of the wheel speed sensor.

In the case of (5), the electric cable of the object information acquisition device can be easily and compactly routed toward upper sides of the front forks together with the electric cable of the wheel speed sensor. In addition, since the electric cables of the object information acquisition device and the wheel speed sensor are gathered and routed along the front forks, the cables are inconspicuous, and good external appearance is obtained.

In addition, a saddle riding vehicle according to another aspect of the present invention includes a pair of left and right front forks configured to support a front wheel; a front fender supported by the pairs of left and right front forks and configured to cover the front wheel from above; and an object information acquisition device configured to acquire information of an object outside the vehicle via an information acquisition part, wherein an upper wall of the front fender has a concave section recessed toward a lower side of the vehicle, and the object information acquisition device is disposed in the concave section (42) such that the information acquisition part faces outside of the vehicle.

Advantageous Effects of Invention

According to the aspect of the present invention, since an information acquisition part of an object information acquisition device is disposed in an opening section of an upper wall of a front fender or a concave section of the upper wall, around which less instruments that shield a range in which information of an object can be acquired are disposed, information of an object in a wide angle range in front of a vehicle can be easily acquired.

DESCRIPTION OF EMBODIMENTS

Figure 1:
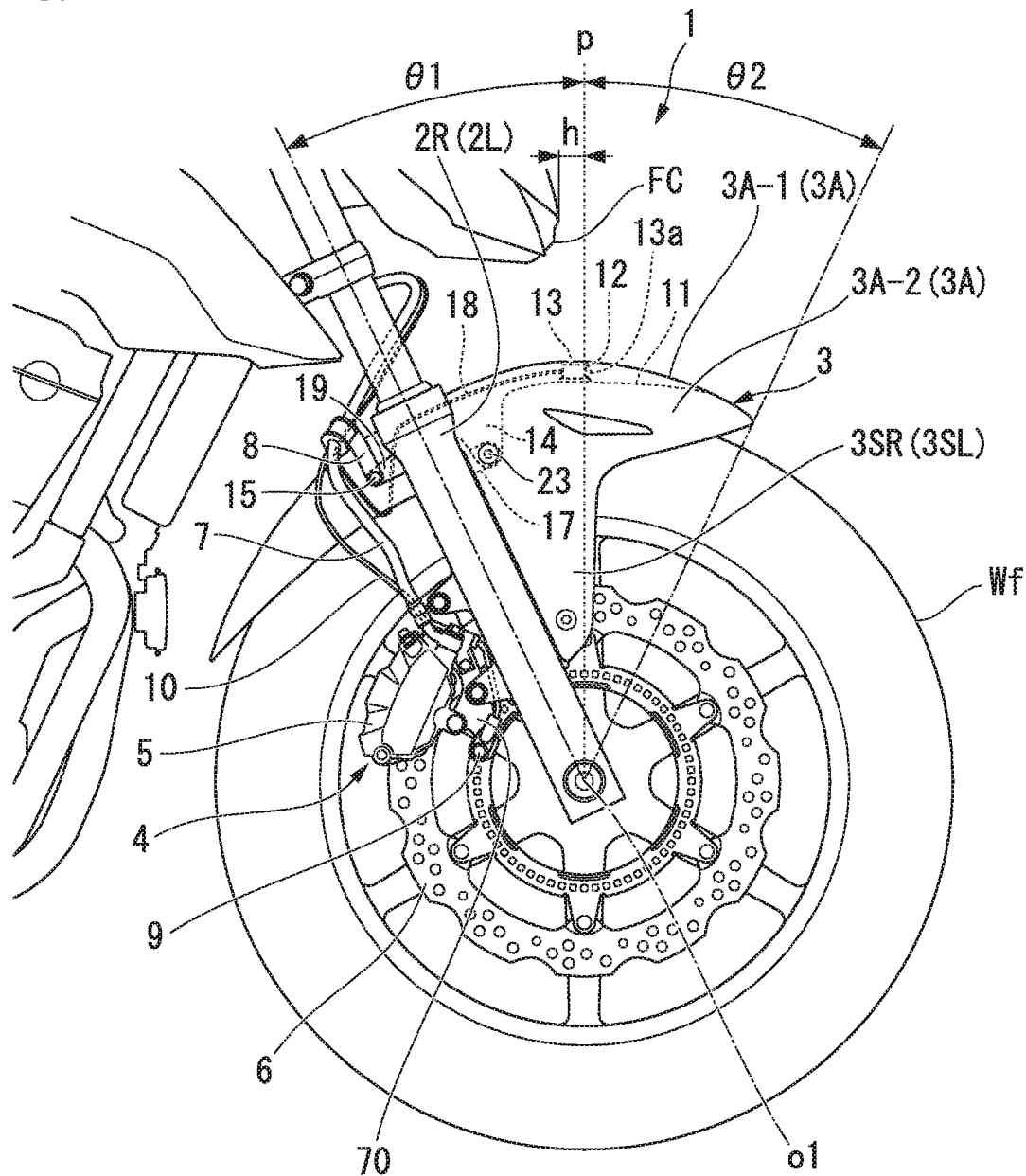
FIG. 1 is a side view of a saddle riding vehicle according to a first embodiment of the present invention.
Figure 1:
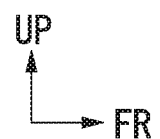

Hereinafter, embodiments of the present invention will be described with reference to the accompanying drawings.

Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

First, a first embodiment shown in FIGS. 1 to 5 will be described.

Figure 2:
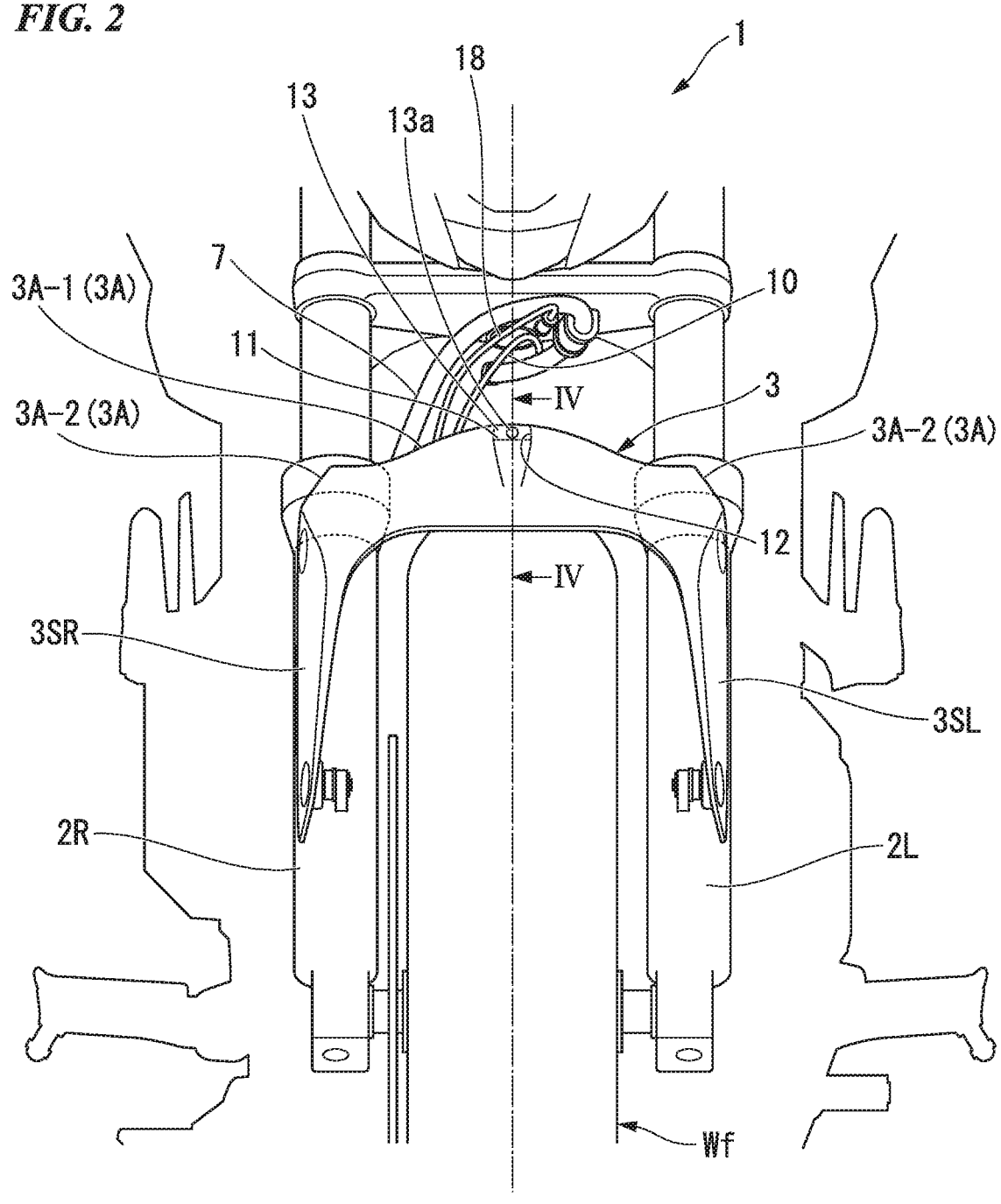
FIG. 2 is a front view of the saddle riding vehicle according to the first embodiment of the present invention.
Figure 2:
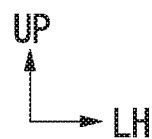

FIG. 1 is a view showing a right side of a front section of a motorcycle 1 that is an aspect of a saddle riding vehicle, and FIG. 2 is a view showing a front surface of the motorcycle 1.

A front wheel Wf of the motorcycle 1 is rotatably supported by lower ends of a pair of left and right front forks 2L and 2R. Upper sections of the left and right front forks 2L and 2R are steerably pivoted by a head pipe (not shown) of a front section of a vehicle body frame via a steering stem (not shown). A steering handle (not shown) is attached to an upper section of the steering stem.

In addition, an instrument panel (not shown), and lamps such as a headlight or the like, are installed on an upper side of the front section of the vehicle body frame.

A front fender 3 configured to cover the front wheel Wf from above and prevent splattering of mud, rain water, or the like, from the front wheel Wf is attached to lower edge portions of the left and right front forks 2L and 2R. The front fender 3 includes a pair of left and right attachment walls 3SL and 3SR extending upward along front edge portions of the left and right front forks 2L and 2R, and a fender main body 3A (an upper wall) formed integrated with the attachment walls 3SL and 3SR to be connected to upper sections of the left and right attachment walls 3SL and 3SR.

The left and right attachment walls 3SL and 3SR of the front fender 3 are fixed to lower edge portions of the left and right front forks 2L and 2R in the front of the vehicle through bolt fastening or the like.

The fender main body 3A of the front fender 3 has a facing wall 3A-1 facing an outer circumferential wall of the front wheel Wf, and sidewalls 3A-2 extending to be curved downward from left and right end portions of the facing wall 3A-1. Upper end portions of the left and right attachment walls 3SL and 3SR are connected to the left and right sidewalls 3A-2 corresponding thereto. In addition, the fender main body 3A extends forward and rearward with respect to the left and right front forks 2L and 2R while being formed substantially on an outer circumferential wall of the front wheel Wf in a substantially arc shape when seen in a side view. An extending section of the fender main body 3A on a front side is set to be longer than an extending section on a rear side. That is, an apex section of the fender main body 3A formed in a substantially arc shape when seen in a side view is disposed at a substantially central portion of the extending section on a front side in a forward/rearward direction.

In addition, a brake caliper 5 of a disk type front brake 4 is attached to a lower edge portion of the front fork 2R on a rear right side of the vehicle via a caliper bracket 70. The front brake 4 applies a braking force to the front wheel Wf by a brake disk 6 integrally attached to the front wheel Wf being sandwiched between pads (not shown) of the brake caliper 5.

A brake hose 7 connected to a master cylinder (not shown) is connected to the brake caliper 5. The brake hose 7 connected to the brake caliper 5 is pulled out upward along the front fork 2R on a right side and drawn from a lower position of the head pipe (not shown) in a direction of a master cylinder. A midway section of the brake hose 7 is held by a clamp part 8 attached to the front fork 2R on a right side at a position on a right side of the front fender 3.

In addition, a wheel speed sensor 9 configured to detect a rotational speed of the front wheel Wf is supported by a lower edge portion of the right front fork 2R on a rear side of the vehicle. An electric cable 10 (including a signal cable) of the wheel speed sensor 9 is extracted upward along the front fork 2R on a right side together with the brake hose 7. The electric cable 10 of the wheel speed sensor 9 is held by the clamp part 8 at a midway section thereof like the brake hose 7.

Figure 3:
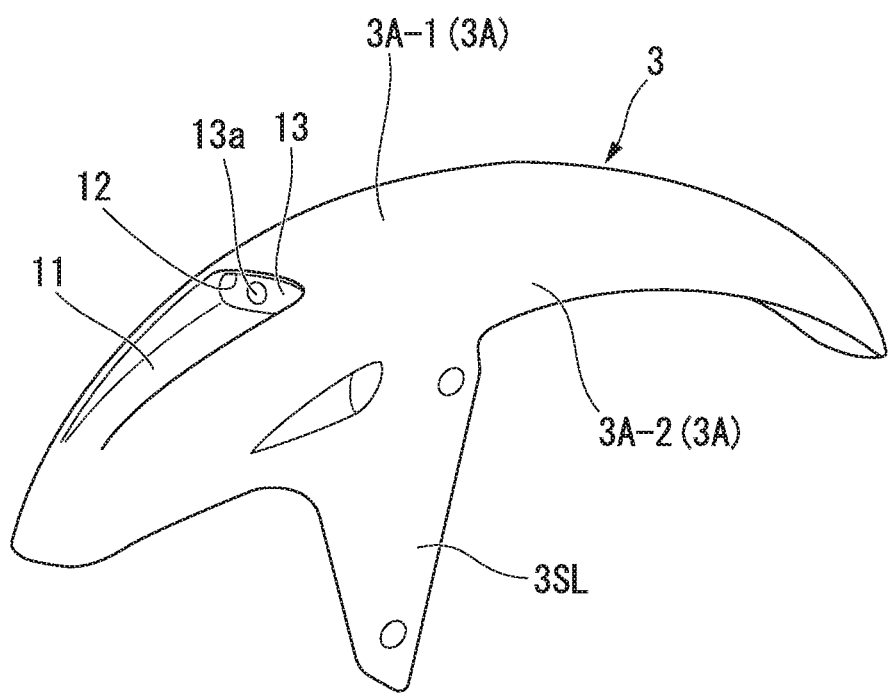
FIG. 3 is a perspective view of a front fender of the saddle riding vehicle according to the first embodiment of the present invention.
Figure 4:
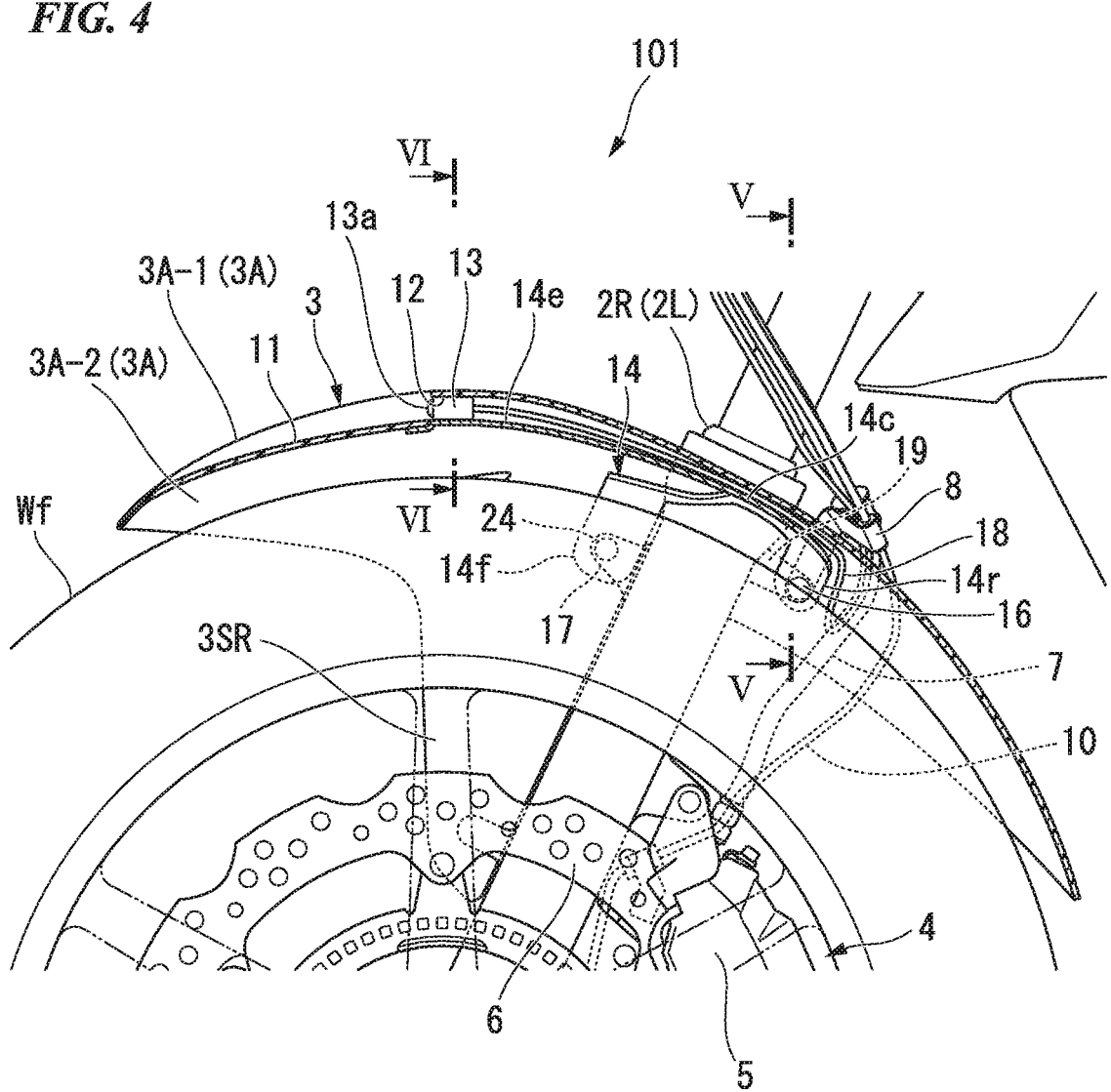
FIG. 4 is a side view of the saddle riding vehicle according to the first embodiment of the present invention, a part of which is taken along line IV-IV in FIG. 2.
Figure 5:
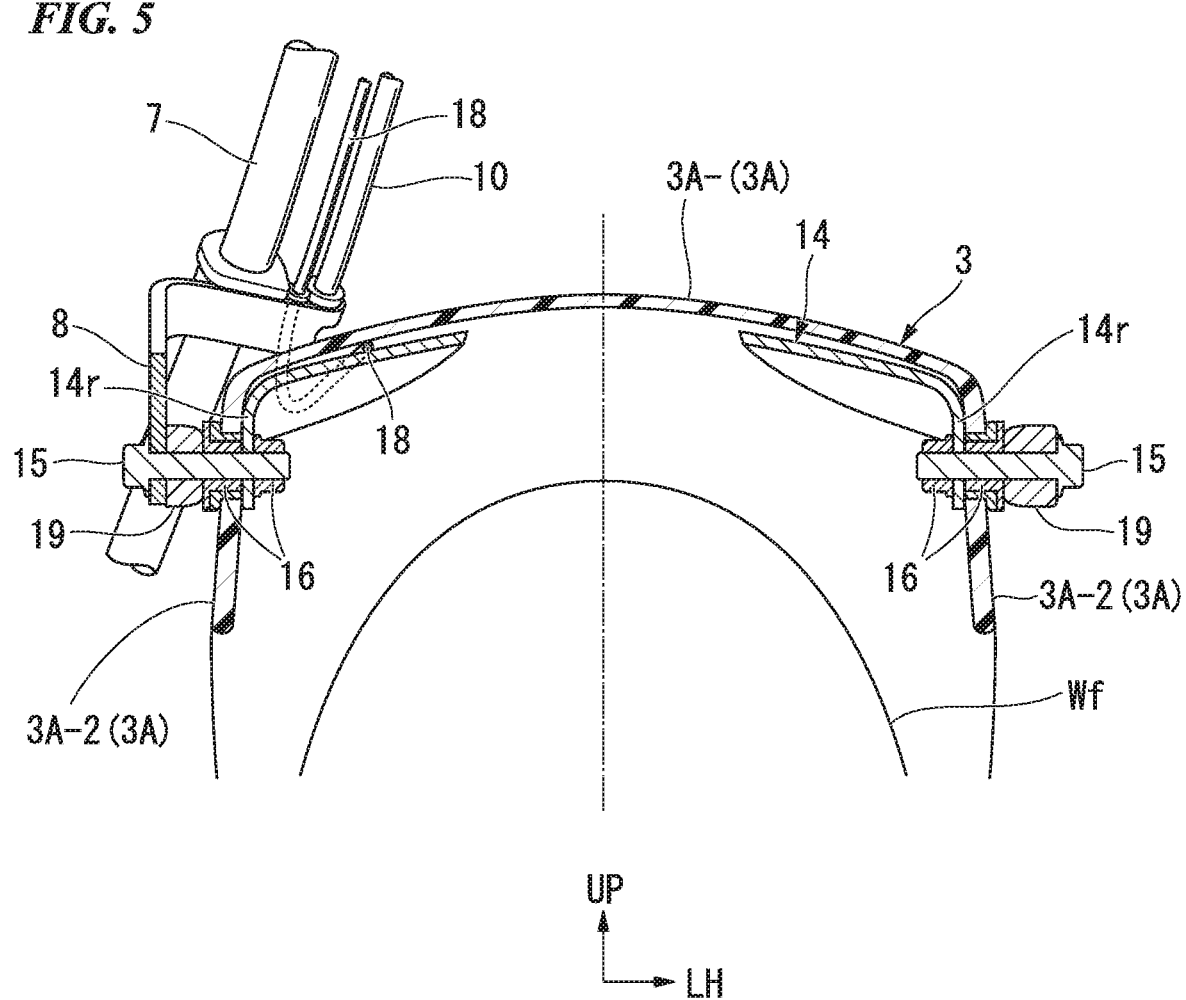
FIG. 5 is a cross-sectional view of the saddle riding vehicle according to the first embodiment of the present invention taken along line V-V in FIG. 4.

FIG. 3 is a view showing the front fender 3 from an upper side of a left front section thereof, and FIG. 4 is a view showing a side surface of the motorcycle 1, a part of which is taken along line IV-IV in FIG. 2. In addition, FIG. 5 is a view showing a cross section of the motorcycle 1 taken along line V-V in FIG. 4.

As shown in FIGS. 3 and 4, the fender main body 3A of the front fender 3 has a concave groove 11 formed in a rectangular cross-sectional shape recessed downward at a central region on a side in front of the facing wall 3A-1 in a vehicle width direction. The concave groove 11 extends in a forward/rearward direction of the vehicle body and is formed to the vicinity of an apex section of the fender main body 3A. A rectangular opening section 12 is formed at a position in a terminal end portion of the fender main body 3A on a rear side of the concave groove 11. An imaging device 13 (an object information acquisition device) using a CCD sensor, a MOS sensor, a CMOS sensor, or the like, is installed inside of the opening section 12. An imaging section 13a (a lens section serving as an information acquisition part) of the imaging device 13 is disposed to protrude from the opening section 12 toward a side in front of the vehicle.

For example, data captured by the imaging device 13 are processed by a signal processing circuit (not shown), displayed on an on-vehicle monitor, recorded on a recording medium, or used for control or the like of various on-vehicle instruments.

Here, a desired installation position of the imaging device 13 in the fender main body 3A will be described in detail.

As shown in FIG. 1, the imaging device 13 is desirably disposed in an angle range (including a range on the vertical virtual line p) obtained by combining an angle range of θ1 on a side behind the vertical virtual line p extending upward from a vehicle axis o1 of the front wheel Wf and an angle range of θ2 on a side in side in front of the vertical virtual line p, among the extending section on the side in front of the fender main body 3A. Further, θ1 is a caster angle of the front wheel Wf, and θ2 is an angle equal to θ1.

Further, in the imaging device 13, a front end portion (the imaging section 13a) of the imaging device 13 is desirably disposed in front of the vehicle axis of such that a part thereof overlaps the vertical virtual line p extending upward from the vehicle axis o1 of the front wheel Wf, and a front end portion (the imaging section 13a) of the imaging device 13 is desirably disposed in front of a tip portion of a front cover FC of the vehicle, in which an instrument panel, lamps such as a headlight, or the like, is disposed, by a predetermined distance h. The predetermined distance h is set to a distance at which the front cover FC is not imaged by the imaging device 13.

Left and right sidewalls 3A-2 of the fender main body 3A and a metal fender stay 14 configured to support a lower surface of the facing wall 3A-1 therebetween from below are disposed below the fender main body 3A of the front fender 3.

The fender stay 14 has a central support wall 14c abutting a lower surface of the facing wall 3A-1 of the fender main body 3A, rear side connecting walls 14r extending from the central support wall 14c toward a left side and a right side of a rear side, front side connecting walls 14f extending from the central support wall 14c toward a left side and a right side of a front side, and an extension wall 14e extending from the central support wall 14c toward a side in front of the vehicle body, between the left and right front forks 2L and 2R.

The left and right rear side connecting walls 14r are fastened and fixed to an attachment bracket 19 of the left and right corresponding front forks 2L and 2R and the sidewalls 3A-2 corresponding to left and right sides of the fender main body 3A by a bolt 15 and a nut 16 that are fastening members. The left and right rear side connecting walls 14r are fixed to the corresponding sidewalls 3A-2 on rear sides of the left and right front forks 2L and 2R.

The left and right front side connecting walls 14f are fastened and fixed to an attachment bracket 17 of the left and right corresponding front forks 2L and 2R and the attachment walls 3SL and 3SR of the front fender 3 by a bolt 23 and a nut 24 that are fastening members. The left and right front side connecting walls 14f are fixed to the attachment bracket 17 and the attachment walls 3SL and 3SR on front sides of the left and right front forks 2L and 2R.

In addition, the extension wall 14e of the fender stay 14 extends from the central support wall 14c toward a lower end of the opening section 12 of the fender main body 3A. The imaging device 13 is fixed to an upper surface of the extension wall 14e on a front end side.

Figure 6:
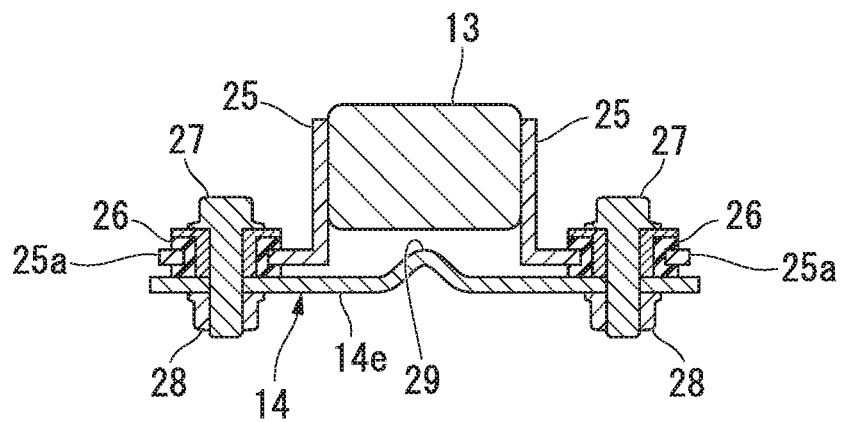
FIG. 6 is a cross-sectional view of the saddle riding vehicle according to the first embodiment of the present invention taken along line VI-VI in FIG. 4.

FIG. 6 is a view showing a cross section taken along line VI-VI in FIG. 4.

The imaging device 13 is held by a bracket 25 having flange sections 25a extending from both sides in the vehicle width direction. The left and right flange sections 25a of the bracket 25 are fastened and fixed to the extension wall 14e of the fender stay 14 via an elastic member 26. Further, reference numerals 27 and 28 in FIG. 5 designate a bolt and a nut configured to fasten and fix the flange sections 25a to the extension wall 14e. In addition, reference numeral 29 in FIG. 5 designates a reinforcement rib protruding from a substantially central position of the extension wall 14e in the vehicle width direction. The reinforcement rib 29 protrudes upward from a lower position of the imaging device 13.

The reinforcement rib 29 increases rigidity of the extension wall 14e and prevents water droplets on the extension wall 14e below the imaging device 13 from staying thereon. Further, while vibrations transmitted to the imaging device 13 can be absorbed by the elastic member 26, a function of performing shake correction of a captured image is desirably provided in the imaging device 13.

In the imaging device 13 attached to the extension wall 14e of the fender stay 14, an electric cable 18 such as an electric power line, a signal line, or the like, is drawn rearward, and the electric cable 18 is drawn toward an upper side along the front fork 2R on a right side through the vicinity of the sidewall 3A-2 on a right side of the fender main body 3A. The electric cable 18 drawn upward is connected to a battery or a control device, which is not shown, supported by a vehicle body frame of the motorcycle 1. In addition, the electric cable 18 of the imaging device 13 is held by the clamp part 8 at the midway section like the brake hose 7 or the electric cable 10 of the wheel speed sensor 9.

As described above, in the motorcycle 1 according to the embodiment, the opening section 12 is formed in the fender main body 3A (an upper wall) of the front fender 3, and the imaging device 13 configured to image the outer side of the vehicle is disposed in the opening section 12 of the fender main body 3A such that the imaging section 13a (a lens section) faces outside of the vehicle on a front side. For this reason, in a portion of the fender main body 3A of the front fender 3 disposed below an instrument panel, lamps such as a headlight or the like, a wide range in front of the vehicle can be easily imaged by the imaging device 13.

In particular, in the motorcycle 1 according to the embodiment, since the opening section 12 is formed in the vicinity of the apex section of the fender main body 3A and the imaging device 13 is disposed in the opening section 12, when the outer side of the vehicle body is imaged, it is possible to reduce taking of vehicle parts and reduce reflection of unnecessary parts of the fender main body 3A on an upper surface side on the imaging device 13.

Further, in the motorcycle 1 according to the embodiment, the concave groove 11 recessed in a concave shape is formed in an upper surface of the fender main body 3A of the front fender 3, and the opening section 12 in which the imaging device 13 is disposed is formed in a terminal end portion of the concave groove 11 on a rear side. For this reason, an object does not easily come in contact with the imaging section 13a (the lens section) of the imaging device 13 disposed in the opening section 12 from the outer side. Accordingly, the motorcycle 1 according to the embodiment can effectively protect the imaging section 13a of the imaging device 13 from the outer side by employing the configuration.

In addition, in the motorcycle 1 according to the embodiment, the fender stay 14 configured to support the left and right sidewalls 3A-2 of the fender main body 3A and the facing wall 3A-1 from below is disposed below the fender main body 3A of the front fender 3, and the imaging device 13 is attached to the extension wall 14e extending from the fender stay 14. For this reason, the imaging device 13 can be stably supported by the fender stay 14 having high strength below the fender main body 3A, and a dedicated stay for installing the imaging device 13 can be eliminated. Accordingly, when the motorcycle 1 according to the embodiment is employed, reduction in manufacturing costs and reduction in weight of the vehicle can be achieved by reducing the number of parts while stable capturing of the outer side of the vehicle can be obtained.

In addition, in the motorcycle 1 according to the embodiment, since the imaging device 13 is attached to the fender stay 14 disposed below the fender main body 3A of the front fender 3, the imaging device 13 is hidden in the fender main body 3A and cannot be easily seen from the outer side. Accordingly, when the configuration is employed, good external appearance is obtained.

Further, in the case of the motorcycle 1 according to the embodiment, since the imaging device 13 is attached to the fender stay 14 via the elastic member 26, vibrations such as traveling vibrations, engine vibrations, or the like, input to the fender stay 14 during traveling of the vehicle can be absorbed by the elastic member 26, and cannot be easily input to the imaging device 13. Accordingly, when the motorcycle 1 according to the embodiment is employed, it is possible to minimize image blur of the imaging device 13 due to input vibrations.

In addition, in the motorcycle 1 according to the embodiment, the electric cable 18 drawn from the imaging device 13 is routed along the front fork 2R together with the electric cable 10 of the wheel speed sensor 9 and the brake hose 7. For this reason, when the configuration is employed, the electric cable 18 of the imaging device 13 can be easily and compactly routed toward an upper side of the front fork 2R together with the electric cable 10 of the wheel speed sensor 9 and the brake hose 7.

In addition, in the case of the embodiment, since the electric cables 18 and 10 of the imaging device 13 and the wheel speed sensor 9 are gathered and routed along the front fork 2R, the electric cables 18 and 10 are inconspicuous, and the exterior appearance is also good.

Further, in the embodiment, since the electric cables 18 and 10 of the imaging device 13 and the wheel speed sensor 9 are gathered with the brake hose 7 having high rigidity and routed, routing of the electric cables 18 and 10 is facilitated. In addition, the electric cables 18 and 10 have the advantage of being guided by the brake hose 7 having high rigidity.

Then, a second embodiment shown in FIGS. 7 to 9 will be described.

Figure 7:
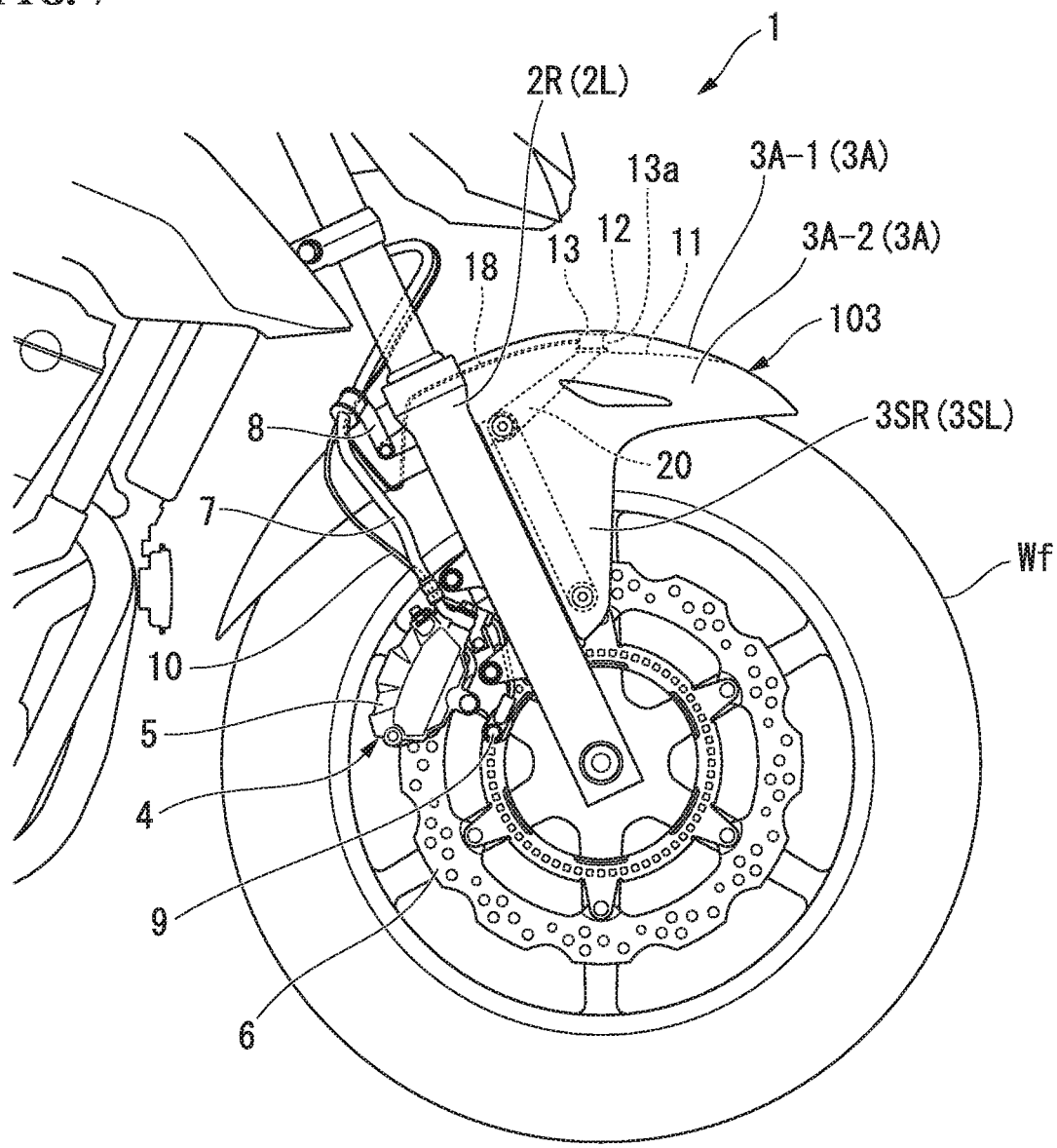
FIG. 7 is a side view of a saddle riding vehicle according to a second embodiment of the present invention.
Figure 8:
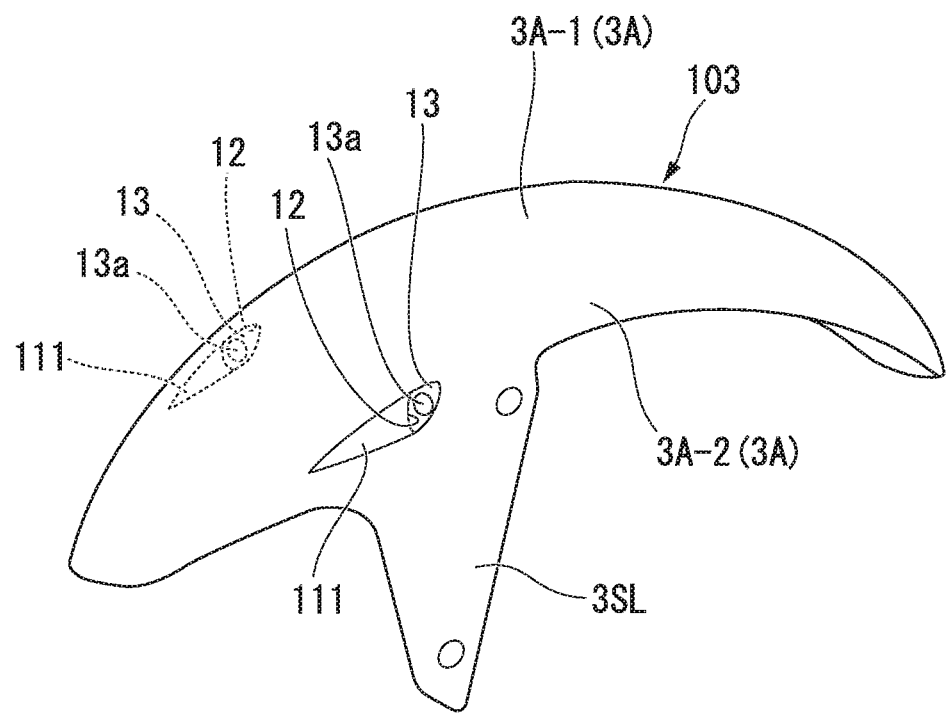
FIG. 8 is a perspective view of a front fender of the saddle riding vehicle according to the second embodiment of the present invention.

FIG. 7 is a right side view of a front section of the motorcycle 101, and FIG. 8 is a view of a front fender 103 when seen from above a left front section. In addition, FIG. 9 is a view showing a longitudinal cross section of a portion of a front section of a motorcycle 101 from a left side.

While the motorcycle 101 according to the second embodiment has substantially the same basic configuration as the first embodiment, disposition of the imaging device 13 (the object information acquisition device) on the front fender 103 and a structure of the support section of the imaging device 13 are different from those of the first embodiment. Further, in FIGS. 7 to 9, the same components as in the first embodiment are designated by the same reference numerals.

Like the first embodiment, the front fender 103 includes a pair of left and right attachment walls 3SL and 3SR attached to front edge portions of the left and right front forks 2L and 2R, and a fender main body 3A (an upper wall) formed integrally with the attachment walls 3SL and 3SR to be connected to upper sections of the left and right attachment walls 3SL and 3SR. The fender main body 3A has a facing wall 3A-1 facing an outer circumferential surface of the front wheel Wf, and sidewalls 3A-2 extending from left and right side portions of the facing wall 3A-1.

As shown in FIG. 8, concave grooves 111 having rectangular cross sections and recessed downward in concave shapes are formed in the vicinity of an apex section of the facing wall 3A-1 of the fender main body 3A at left and right sides of a center in the vehicle width direction. Opening sections 12 having a rectangular shape are formed in terminal end portions of the concave grooves 111 on a rear side. The imaging devices 13 are installed inside the opening sections 12, respectively. The imaging section 13a (a lens section that is an information acquisition part) of the imaging device 13 is disposed to protrude from the opening section 12 toward a side in front of the vehicle.

Figure 9:
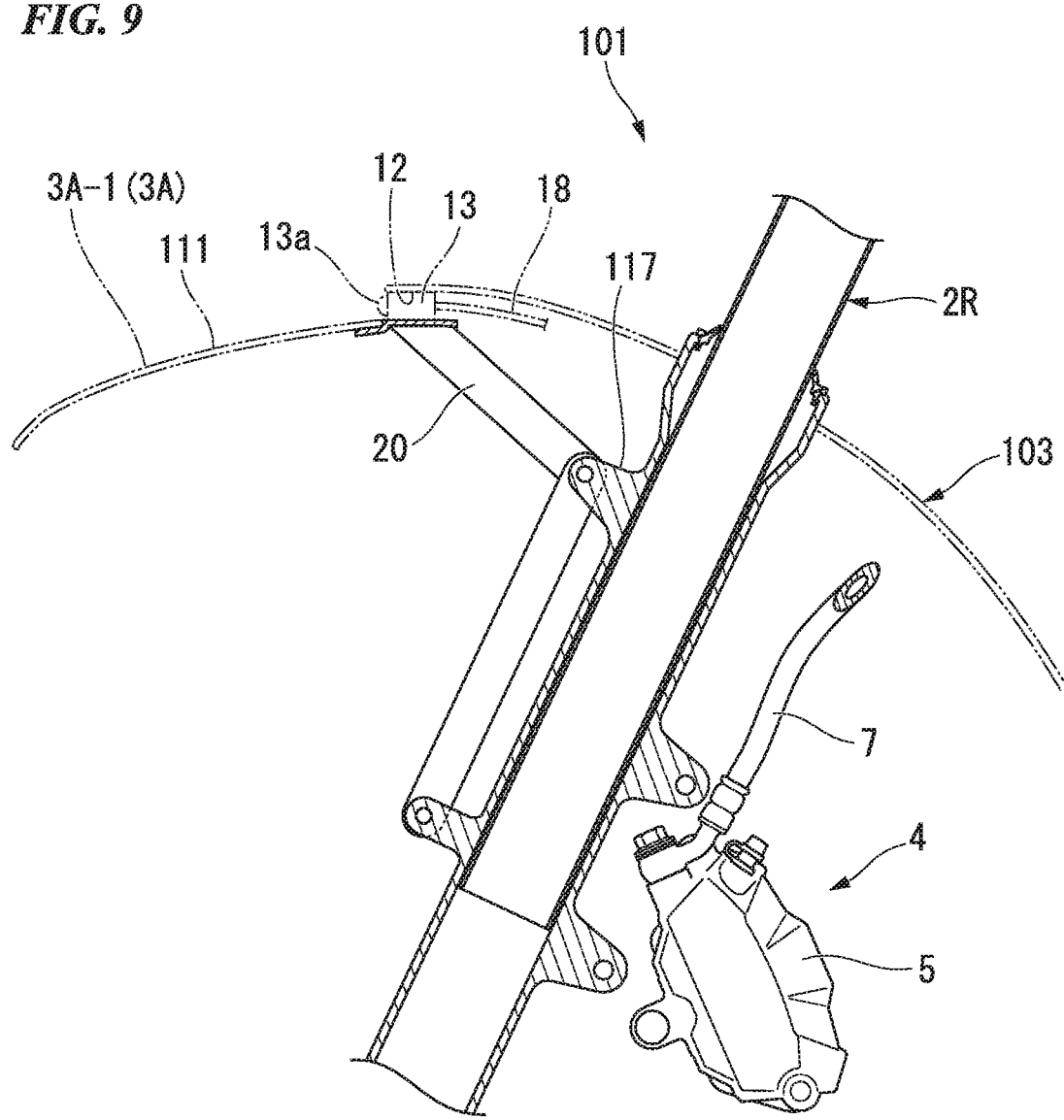
FIG. 9 is a partially-cut side view of the saddle riding vehicle according to the second embodiment of the present invention.

As shown in FIG. 9, attachment brackets 117 protrudes from lower edge portions of the left and right front forks 2L and 2R on a side in front of the vehicle. Stays 20 for installing the imaging devices (for installing the object information acquisition devices) are attached to the attachment brackets 117 of the left and right front forks 2L and 2R. Each of the stays 20 extends from the attachment bracket 117 in a direction of the opening section 12 of the fender main body 3A, and the corresponding imaging device 13 is attached to an extension end thereof. Even in the embodiment, each of the imaging devices 13 is desirably attached to the stay 20 via an elastic member (not shown).

In the motorcycle 101 according to the embodiment, while disposition of the imaging device 13 on the front fender 103 and a structure of the support section of the imaging device 13 are slightly different from those in the first embodiment, since basic configurations are the same as the first embodiment, substantially the same effects as the first embodiment can be obtained.

However, in the motorcycle 101 according to the second embodiment, since the imaging devices 13 are laterally symmetrically disposed with a center the front fender 103 in the vehicle width direction sandwiched therebetween, a side in front of the vehicle can be more widely imaged by the two imaging devices 13, and the left and right imaging devices 13 can also be used as a stereo camera or the like.

Figure 10:
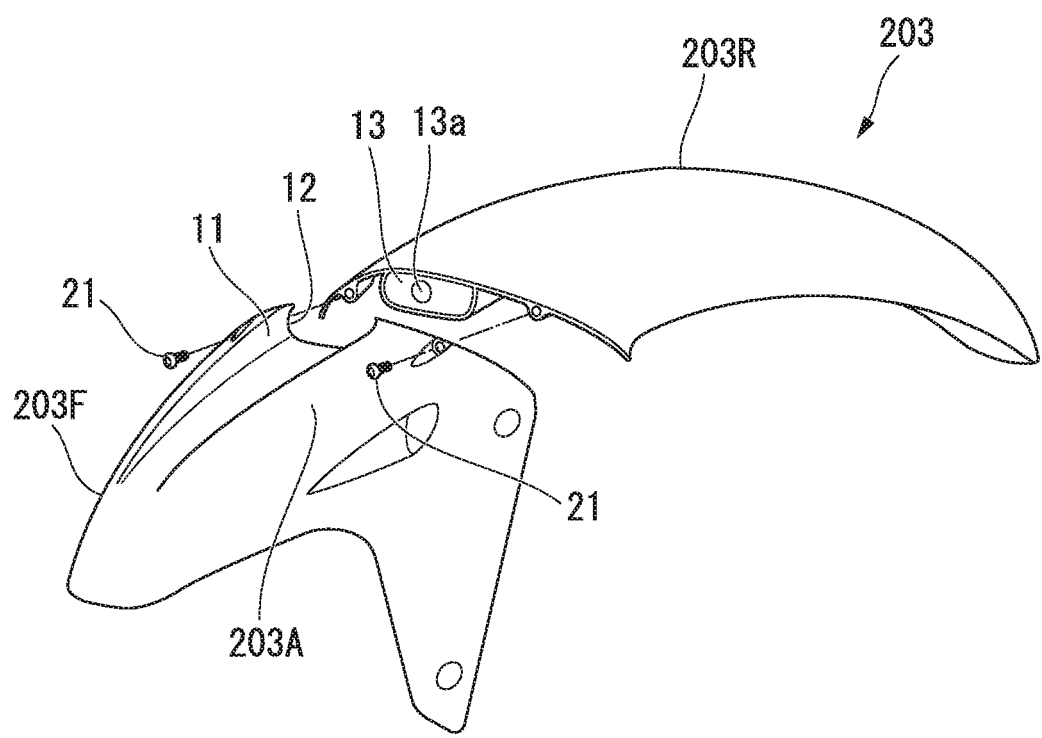
FIG. 10 is a perspective view of a front fender of a saddle riding vehicle according to a third embodiment of the present invention.
Figure 10:
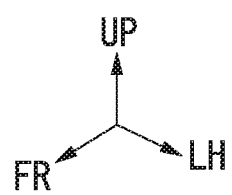

FIG. 10 is a view showing a front fender 203 of a motorcycle according to a third embodiment from above a left front section.

While all of the front fenders 3 and 103 of the first and second embodiment are formed as an integrated part, the front fender 203 of the third embodiment has a first fender 203F disposed on a front side and a second fender 203R disposed on a rear side. The first fender 203F and the second fender 203R are configured to be divided at front and rear sides at positions in the vicinity of an apex section of an upper surface of a fender main body 203A. The first fender 203F and the second fender 203R are fastened and fixed to each other by bolts 21 or the like at facing sections thereof in the forward/rearward direction thereof.

The concave groove 11 having a substantially rectangular shape recessed downward in a concave shape is formed in the forward/rearward direction at substantially a center of an upper surface of the fender main body 203A of the first fender 203F in the vehicle width direction. The opening section 12 having a substantially rectangular shape is formed between a rear end portion of the concave groove 11 of the first fender 203F and a front end portion of the second fender 203R. Like the first embodiment, the imaging device 13 is disposed inside the opening section 12 such that the imaging section 13a protrudes forward from the opening section 12.

In the motorcycle according to the embodiment, since the opening section 12 is configured in a joining section of the first fender 203F and the second fender 203R, which are separate members, while the same effects as the first embodiment can be obtained, the opening section 12 in which the imaging device 13 is disposed can be easily formed.

Figure 11:
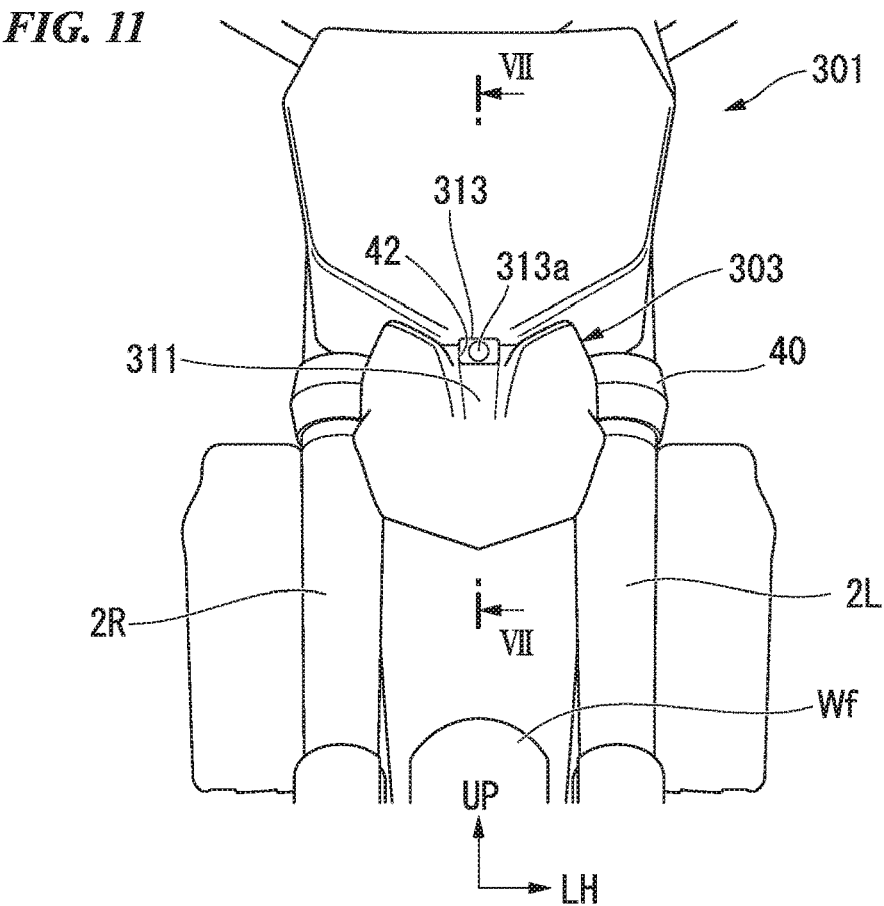
FIG. 11 is a side view of a saddle riding vehicle according to a fourth embodiment of the present invention.
Figure 12:
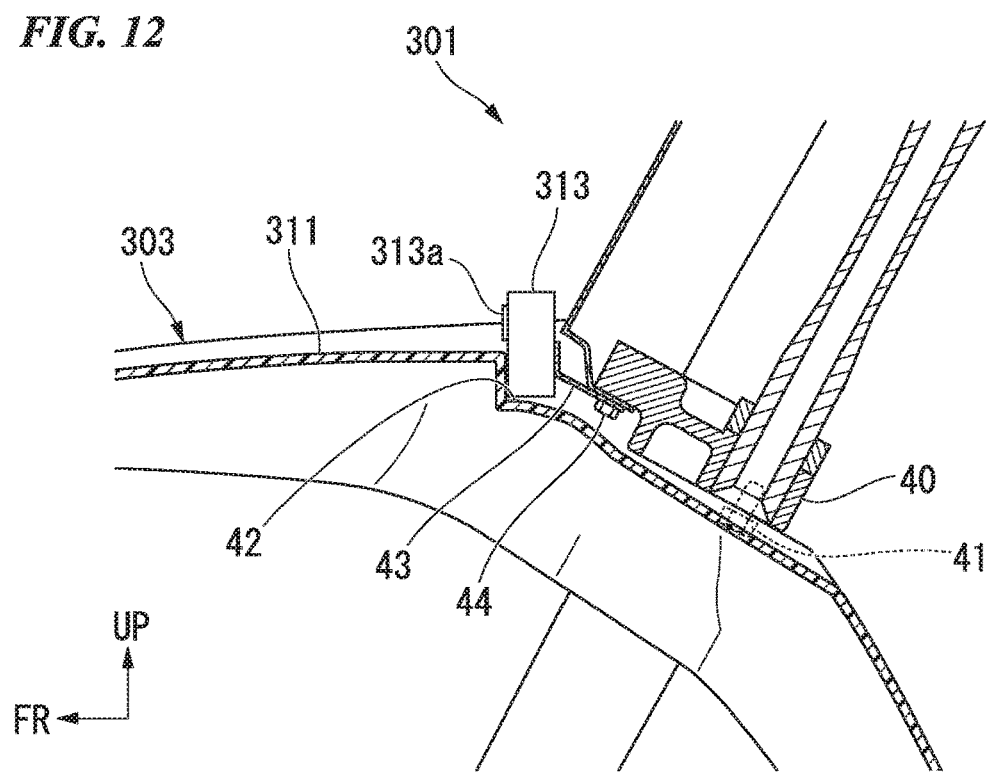
FIG. 12 is a cross-sectional view of the saddle riding vehicle according to the fourth embodiment of the present invention taken along line XII-XII in FIG. 11.

FIGS. 11 and 12 are views showing a part of a motorcycle 301 according to a fourth embodiment. FIG. 11 is a view showing a front surface of the motorcycle 301, and FIG. 12 is a view showing a cross section taken along line XII-XII in FIG. 11.

In the motorcycle 301 according to the fourth embodiment, the front fender 303 is fastened and fixed to a lower end of a bottom bridge 40 that connects the left and right front forks 2L and 2R to each other under the head pipe (not shown) by bolts 41. A concave section 42 recessed downward is formed in an upper wall of the front fender 303 at a position immediately in front of the bottom bridge 40. An imaging device 313 (an object information acquisition device) using a CCD sensor, a MOS sensor, a CMOS sensor, or the like, is installed in the concave section 42. An imaging section 313a (a lens section that is an information acquisition part) of the imaging device 313 is disposed to protrude upward from the concave section 42 toward a side in front of the vehicle. The imaging device 113 is fastened and fixed to a lower surface of a front edge portion of the bottom bridge 40 via a bracket 43 by a bolt 44 inside the concave section 42.

Further, a concave groove 311 recessed downward to be shallower than the concave section 42 is formed in an upper wall of the front fender 303 on a side in front of the concave section 42. The concave groove 311 extends forward from the concave section 42 to secure a front visual field of the imaging section 313a of the imaging device 313.

In the motorcycle 301 according to the fourth embodiment, the concave section 42 is formed in the upper wall of the front fender 303, and the imaging device 313 is disposed in the concave section 42 of the front fender 303 such that the imaging section 313a (the lens section) faces the outer side on the side in front of the vehicle. For this reason, like the first to third embodiments, a wide range in front of the vehicle can be easily imaged by the imaging device 313 at a position below an instrument panel or lamps such as a headlight or the like.

Further, the present invention is not limited to the above-mentioned embodiments and various design changes may be made without departing from the scope of the present invention. For example, in the above-mentioned embodiments, while the imaging device 13 or 113 is used as the object information acquisition device configured to acquire information of an object outside the vehicle, the object information acquisition device is not limited to the imaging device 13 or 313 and an apparatus such as an ultrasonic sensor, an infrared sensor, or the like, may be provided as long as the apparatus can acquire information of an object.

In addition, the saddle riding vehicle according to the present invention is not limited to a motorcycle (including a motorized bicycle and a scooter-type vehicle) and also include a three-wheeled vehicle such as a one-front-wheeled and two-rear-wheeled vehicle, or the like.

REFERENCE SIGNS LIST 1, 301 Motorcycle (saddle riding vehicle)
2L, 2R Front forks
3, 103, 203, 303 Front fender
3A Fender main body
9 Wheel speed sensor
10 Electric cable
12 Opening section
13, 313 Imaging device (object information acquisition device)
13a, 313a Imaging section (information acquisition part)
14 Fender stay
18 Electric cable
20 Stay
42 Concave section
203F First fender
203R Second fender
Wf Front wheel

What is claim is:
1. A saddle riding vehicle comprising:
a pair of left and right front forks configured to support a front wheel;
a front fender supported by the pair of left and right front forks and configured to cover the front wheel from above; and
an object information acquisition device configured to acquire information of an object outside the vehicle via an information acquisition part, wherein an upper wall of the front fender has an opening section facing outside of the vehicle, and the object information acquisition device is disposed in the opening section such that the information acquisition part faces outside of the vehicle.

2. The saddle riding vehicle according to claim 1, wherein a fender stay configured to support a space between a left end portion and a right end portion of the upper wall from below is disposed below the upper wall of the front fender, and the object information acquisition device is attached to the fender stay.

3. The saddle riding vehicle according to claim 1, wherein the object information acquisition device is attached to a stay for installing the object information acquisition device via an elastic member.

4. The saddle riding vehicle according to claim 1, wherein the front fender has a first fender disposed on a front side, and a second fender disposed on a rear side, the first fender and the second fender are coupled to each other to configure the front fender, and the opening section that opens toward a side in front of the vehicle is formed in a joining section between the first fender and the second fender.

5. The saddle riding vehicle according to claim 1, further comprising a wheel speed sensor configured to detect a rotational speed of the front wheel, wherein an electric cable of the object information acquisition device is routed along the front forks together with an electric cable of the wheel speed sensor.

6. A saddle riding vehicle comprising:

a pair of left and right front forks configured to support a front wheel;

a front fender supported by the pair of left and right front forks and configured to cover the front wheel from above; and an object information acquisition device configured to acquire information of an object outside the vehicle via an information acquisition part, wherein an upper wall of the front fender has a concave section recessed toward a lower side of the vehicle, and the object information acquisition device is disposed in the concave section such that the information acquisition part faces outside of the vehicle.

* * * * *